UNITED STATES PATENT OFFICE.

CYRUS L. TOPLIFF, OF NEW YORK, N. Y.

IMPROVEMENT IN LAMP-WICKS.

Specification forming part of Letters Patent No. 55,745, dated June 19, 1866.

*To all whom it may concern:*

Be it known that I, CYRUS L. TOPLIFF, of No. 37 Park Row, in the city, county, and State of New York, have invented a new and useful Improvement in Lamp-Wicks; and I do hereby declare that the following is a full, clear, and exact description thereof, which will enable others skilled in the art to make and use the same.

This invention consists in the application to a lamp-wick of a solution of alum and gum, rendering the materials of the wick partially incombustible. By this means I obtain what may be termed a "perpetual lamp-wick," or a wick which can be burned for weeks, and perhaps for months, without requiring to be trimmed; and, furthermore, the expense of the application of the composition is so trifling that it does not increase the cost of the wick but a trifle, and a lasting lamp-wick can be furnished to the public at a very small price.

I prefer in this composition to use gumarabic, though other gums may answer the purpose. The proportions I have adopted are three parts alum and one part gum in a solution.

What I claim as new, and desire to secure by Letters Patent, is—

The application to a lamp-wick of a solution of gum and alum, for the purpose described.

C. L. TOPLIFF.

Witnesses:
W. HAUFF,
J. W. B. COVINGTON.